US007963251B2

(12) United States Patent
Lapidge et al.

(10) Patent No.: US 7,963,251 B2
(45) Date of Patent: Jun. 21, 2011

(54) ANIMAL TOILETING SYSTEM AND METHOD

(76) Inventors: Terence Jeffery Lapidge, Killarney Heights (AU); Joanna Fredericks, New South Wales (AU)

(*) Notice: Subject to any disclaimer, the term of this patent is extended or adjusted under 35 U.S.C. 154(b) by 69 days.

(21) Appl. No.: 11/912,510

(22) PCT Filed: Mar. 31, 2006

(86) PCT No.: PCT/AU2006/000424
§ 371 (c)(1),
(2), (4) Date: Oct. 25, 2007

(87) PCT Pub. No.: WO2006/113964
PCT Pub. Date: Nov. 2, 2006

(65) Prior Publication Data
US 2008/0202439 A1  Aug. 28, 2008

(30) Foreign Application Priority Data
Apr. 26, 2005 (AU) ................................ 2005201713

(51) Int. Cl.
*A01K 29/00* (2006.01)
(52) U.S. Cl. ........................................................ 119/162
(58) Field of Classification Search .................. 119/162, 119/161, 712; 4/237, 661; *A01K 29/00*
See application file for complete search history.

(56) References Cited

U.S. PATENT DOCUMENTS

| 54,480 | A | | 5/1866 | Alexander |
|---|---|---|---|---|
| 426,287 | A | * | 4/1890 | Larkin ............................... 4/234 |
| 3,672,331 | A | * | 6/1972 | Brody et al. ................... 119/162 |
| 3,688,742 | A | * | 9/1972 | McGee .......................... 119/162 |
| 3,921,582 | A | * | 11/1975 | Sedlmeir ....................... 119/161 |
| 3,949,429 | A | | 4/1976 | Hall |
| 4,181,096 | A | * | 1/1980 | Grubman ....................... 119/162 |
| 4,271,544 | A | * | 6/1981 | Hammond ......................... 4/661 |
| 4,461,046 | A | | 7/1984 | Adams |
| 5,161,263 | A | * | 11/1992 | Geneve et al. .................... 4/483 |
| 5,216,979 | A | * | 6/1993 | Sallee et al. .................. 119/162 |
| 6,014,946 | A | | 1/2000 | Rymer |
| 6,119,629 | A | * | 9/2000 | Sicchio ......................... 119/162 |
| 6,418,880 | B1 | * | 7/2002 | Chiu .............................. 119/162 |
| 6,701,539 | B1 | * | 3/2004 | Hogan ............................. 4/235 |
| 6,860,231 | B1 | | 3/2005 | Rus |
| D533,974 | S | * | 12/2006 | Hirokawa et al. ............ D30/161 |
| 7,395,784 | B2 | * | 7/2008 | Hirokawa et al. ............. 119/165 |
| 7,485,166 | B2 | * | 2/2009 | Safuto .......................... 55/385.1 |
| 2002/0078899 | A1 | * | 6/2002 | Chiu .............................. 119/162 |
| 2007/0245486 | A1 | * | 10/2007 | Battle et al. ...................... 4/661 |

FOREIGN PATENT DOCUMENTS
RU           2058108 C1    4/1996
* cited by examiner

*Primary Examiner* — Son T. Nguyen
*Assistant Examiner* — Shadi Baniani
(74) *Attorney, Agent, or Firm* — Galbreath Law Offices, P.C.; John A. Galbreath

(57) ABSTRACT

An animal toileting system including a device (10) having a zone (19) into which an animal may urinate, defecate or both. The zone (19) has an aperture (18) through which animal waste may pass. A number of inserts (30, 32, 34) are provided that reduce or block the size of the aperture (18).

21 Claims, 10 Drawing Sheets

SECTION BB

ANIMAL TOILETING SYSTEM AND METHOD

FIELD OF INVENTION

This invention relates to animal toileting for animals and more particularly to training a pet animal to use a human toilet.

BACKGROUND

People keep pets such as cats and dogs for a number of reasons. In urban areas many people keep their pets indoors for all or part of the day, particularly at night and prevent them going outside. This may be to prevent the animal from wandering and becoming lost, to prevent the animal killing native animals or for other reasons.

This leads to the animal being unable to go outside to urinate or defecate. The usual solution to this is to provide a tray with absorbent material into which the animal may urinate or defecate. This has a number of disadvantages, including odour, the need to regularly remove faeces and the need to periodically replace the absorbent material.

SUMMARY OF THE INVENTION

One of the aims of embodiments of the invention is to ultimately have an animal trained to use a human toilet pan to defecate and urinate. It will be appreciated that for a small animal, such as cat or a small dog, to initially use the aperture presented by a toilet or toilet seat is difficult and the animal must be slowly introduced to the concept of urinating or defecating through an aperture, rather than onto a layer of absorbent material.

To achieve this, according to a preferred embodiment of the invention, the animal is first trained to use a device in the manner of a conventional waste tray, in that there is a solid base overlaid with absorbent material onto which waste may be deposited. Once the animal is comfortable using the device, the device is placed on top of the toilet and the animal continues use a device in the manner of a conventional tray. The device is then a reconfigured so as to provide a relatively small aperture, preferably in its centre, through which the animal will defecate and urinate. Once the animal becomes comfortable urinating and defecating through the small aperture, the aperture is progressively increased in size until there is merely the surround upon which the animal supports itself whilst it urinates or defecates.

In the preferred embodiment the size of the aperture is modified by inserts that selectively block part of a larger aperture. Preferably, an insert initially blocks the entire aperture to enable the device to be used as a simple waste tray with conventional absorbent material. The insert is then replaced with another of a series of inserts, each of which has a progressively larger opening.

Accordingly, in one broad form, the invention provides an animal toileting stem including a device having a zone into which an animal may urinate, defecate or both, the zone having a base, the system including aperture providing means operable to:
   provide a first aperture, or
   vary the effective size of a first aperture, or both
   in at least part of the base,
   through which animal waste may pass.

The aperture providing means may include at least one movable or removable member that may be selectively moved or removed to reveal, create or increase the size of the first aperture.

The aperture providing means may include an iris arrangement and/or at least one movable member adapted to extend over or into the first aperture to reduce its effective size.

The at least one moveable member may include at least one blocking member, a one of the at least one blocking member having an aperture smaller than the first aperture.

A one of the at least one blocking member may not have an aperture and totally or substantially totally block the first aperture.

The zone may include a recess in the device and the first aperture may be provided in the base of the recess.

The recess is preferably adapted to support a movable member over the first aperture.

The base of the recess may include at least one removable portion, whereby the first aperture may be created or size of the first aperture may be modified.

At least one blocking member may include at least one removable portion, whereby an aperture in the blocking member may be created or the size of an aperture in the blocking member may be modified.

The at least one removable portion may be defined by one or more lines of weakness.

The animal toileting system preferably includes at least two removable portions, preferably three.

The device is preferably adapted to be supported on or above a human toilet bowl having a user accessible opening with the aperture over or in the user accessible opening, whereby an animal may urinate, defecate or both through the first aperture into the toilet bowl.

Accordingly, in another broad form, the invention also provides a method of training an animal to use a human toilet bowl, the method including the steps of:
   a. providing a base unit upon which the animal may support itself whilst urinating, defecating or both, the base unit including a zone into which the animal may urinate, defecate or both;
   b. positioning the base unit on a toilet bowl; and,
   c. training the animal to urinate, defecate or both into the zone whilst the base unit is on the toilet bowl.

The method may include positioning the base unit on the floor and training the animal to urinate, defecate or both into the zone whilst the base unit is located on the floor.

The method may include placing absorbent material in at least part of the zone.

The method may include providing an aperture in the zone accessible to the animal and through which the animal may urinate, defecate or both into the toilet bowl.

The zone preferably has a first aperture and initially the aperture is fully or substantially fully closed The step of providing an aperture accessible to the animal may include exposing at least a part of the first aperture in the zone.

The first aperture may be defined by an iris arrangement and the step of creating an aperture or increasing the size of the aperture includes adjusting the iris arrangement.

The step of providing an aperture accessible to the animal may include creating an aperture in the zone.

The zone may have a base wall and the step of creating an aperture in the zone includes selectively removing one or more portions of the base wall.

The zone may have a base wall having an aperture therein and the method includes selectively blocking or exposing at least part of the aperture.

The step of selectively blocking or exposing at least part of the aperture includes positioning at least one blocking member over or in the aperture.

The at least one blocking member may include a blocking member that substantially or fully closes the aperture.

The at least one blocking member may include a blocking member having an aperture therein through which the animal may urinate, defecate or both.

The at least one blocking member may include at least two blocking members, each having an aperture therein through which the animal may urinate, defecate or both, each of said apertures being of different sizes and the method may include positioning a selected one of said blocking members in or over the aperture.

At least one blocking member may include at least one removable portion, whereby an aperture in the blocking member may be created or the size of an aperture in the blocking member may be modified and wherein providing a first aperture includes removing at least one removable portion.

In another broad form the invention provides an animal toileting system including:

a base unit having a zone into which an animal may urinate, defecate or both, the zone having a first base wall and a first aperture in at least part of the first base wall, through which animal waste may pass;

at least one replaceable blocking member, said base unit configured to support a selected one of the at least one replaceable blocking member so as to extend over or into the first aperture to reduce the effective size of first aperture, the effective size of the first aperture being adjusted by supporting a replaceable blocking member on the base unit or changing the blocking member supported on the base unit.

At least one of the at least one blocking member may have a second aperture that overlies the first aperture. One of the at least one blocking member may totally or substantially totally blocks the first aperture.

At least one replaceable member may have a second base wall, a periphery of the second base wall and a second aperture in the second base wall remote from the periphery. At least one replaceable member may include a peripheral wall. The second base wall may include at least one stiffening structure for stiffening the second base wall. The second base wall may be generally planar and the at least one stiffening structure may extend upwardly from the plane of the second wall. At least one stiffening structure may be adjacent the periphery of the second aperture and extends upwards, thereby defining part of an annular trough around the second aperture. the at least one stiffening structure may include at least one ridge or discontinuity in the second base wall.

The zone may include a recess and the first base wall is the base of the recess. The recess may be sized to receive a selected one of the at least one replaceable blocking member. A selected one of the at least one replaceable blocking member may be supported within the recess.

The first base wall may include an annular rim surrounding the first aperture, the annular rim adapted to support a replaceable member. The first base wall may include at least one removable first portion, whereby the first aperture may be created or size of the first aperture may be modified.

The height of the peripheral wall of a replaceable member may be substantially the same as the depth of the recess.

One replaceable member may be is sized to fit within another replaceable member.

At least one blocking member may include at least one removable second portion, whereby an aperture in the blocking member may be created or the size of an aperture in the blocking member may be modified.

The base unit may be adapted to be supported on or above a human toilet bowl having a user accessible opening with the aperture over or in the user accessible opening, whereby an animal may urinate, defecate or both through the first aperture into the toilet bowl.

The base unit may include an annular rim surrounding the zone whereby the base unit may be supported on the device on the rim of a toilet.

In another broad form the invention provides a method of training an animal to use a human toilet bowl, the method including the steps of:

a. providing a base unit,
   the base unit having a zone into which an animal may urinate, defecate or both, the zone having a first base wall and a first aperture in at least part of the first base wall, through which animal waste may pass;
   at least one replaceable blocking member,
   said base unit configured to support a selected one of the at least one replaceable blocking member so as to extend over or into the first aperture to reduce the effective size of first aperture,
   the effective size of the first aperture being adjusted by supporting a replaceable blocking member on the base unit or changing the blocking member supported on the base unit.
b. positioning the base unit on a toilet bowl; and,
c. training the animal to urinate, defecate or both into the zone whilst the base unit is on the toilet bowl.

preferably the first aperture is initially fully or substantially fully closed.

preferably a blocking member initially substantially or fully closes the first aperture.

preferably the effective size of the first aperture is progressively increased. This is preferably achieved by progressively replacing blocking members in or over the aperture.

at least one blocking member includes a replaceable blocking member having an aperture therein through which the animal may urinate, defecate or both.

at least one blocking member may have an aperture therein through which the animal may urinate, defecate or both.

the at least one blocking member may include at least two blocking members, each having an aperture therein through which the animal may urinate, defecate or both, each of said apertures being of different sizes and the method includes positioning a selected one of said blocking members in or over the aperture.

at least one blocking member may include at least one first removable portion, whereby an aperture in the blocking member may be created or the size of an aperture in the blocking member may be modified and wherein the method includes removing at least one removable portion.

the first base wall may include at least one removable second portion, whereby the first aperture may be created or size of the first aperture may be modified and wherein the method includes removing at least one removable second portion.

The method may also include positioning the base unit on the floor and training the animal to urinate, defecate or both into the zone whilst the base unit is located on the floor.

The method may also include placing absorbent material in at least part of the zone.

DETAILED DESCRIPTION OF PREFERRED AND OTHER EMBODIMENTS

Figure 1:
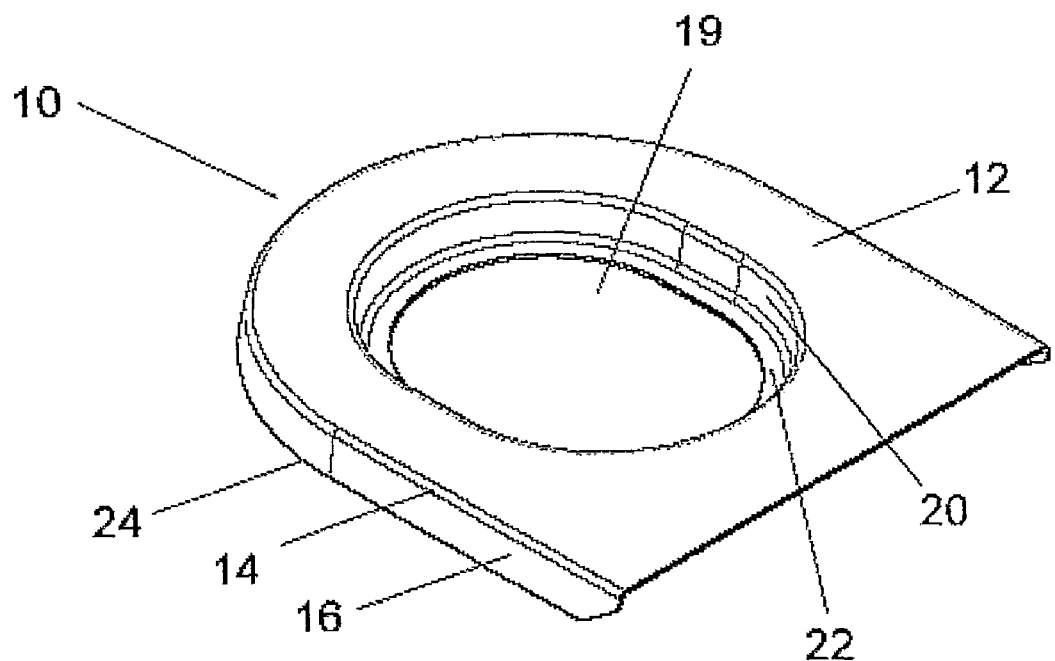
FIG. 1 shows a perspective view of a base unit of an embodiment of the invention.
Figure 2:
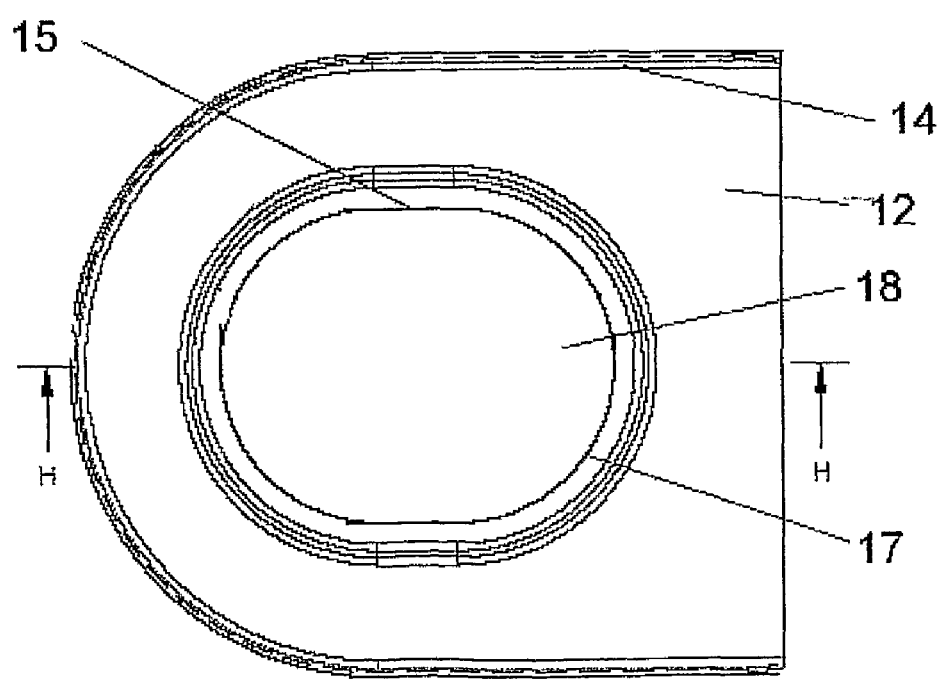
FIG. 2 shows a top plan view of the base unit of FIG. 1.
Figure 3:
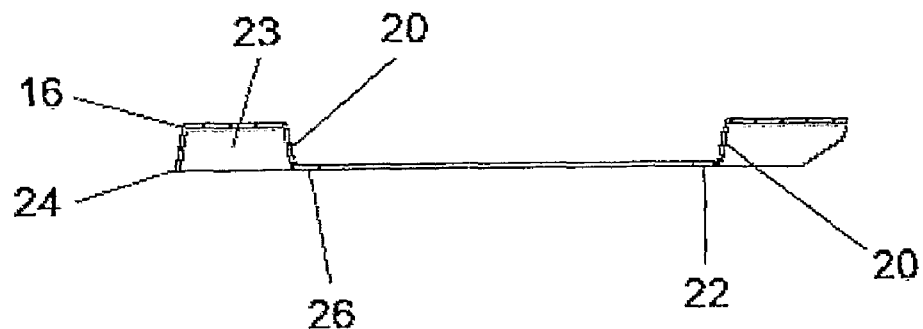
FIG. 3 shows a side cross sectional view of the base unit of FIGS. 1 and 2 taken along lines H-H in FIG. 2.

Referring to FIGS. 1 to 3 an embodiment of the invention includes a base unit 10. The base unit 10 has a generally planner horizontal wall 12 having a U-shaped perimeter 14. Extending downwards from the perimeter 14 is a peripheral wall 16. This wall 16 extends outwards at about 80° to the horizontal. This angle is not critical but aids in placing the base unit 10 over the rim of a toilet bowl, as described later. Located in the centre of the horizontal wall 12 is a well 19. This well 19 is defined by a downwardly extending wall portion 20 and a horizontally extending annular wall portion 22. The annular wall portion 22 also defines an aperture 18 in the base of the well 19. The wall 20 extends inwards at about 80° to the horizontal. This angle is not critical but aids in placing an insert in the well 19 of the base unit. The well 19 has semi-circular ends 15 and straight sides 17 but may be a true oval, circle or any other shape considered suitable. In the preferred embodiment the aperture 18 has a width of about 200 mm and a length of about 250 mm.

The wall 16 and wall portion 20 define a U-shaped channel 23. As best seen in FIG. 3, the free edge 24 of the perimeter wall 16 and the lower surface 26 of the annular wall 22 lie substantially in a common plane.

Figure 4:
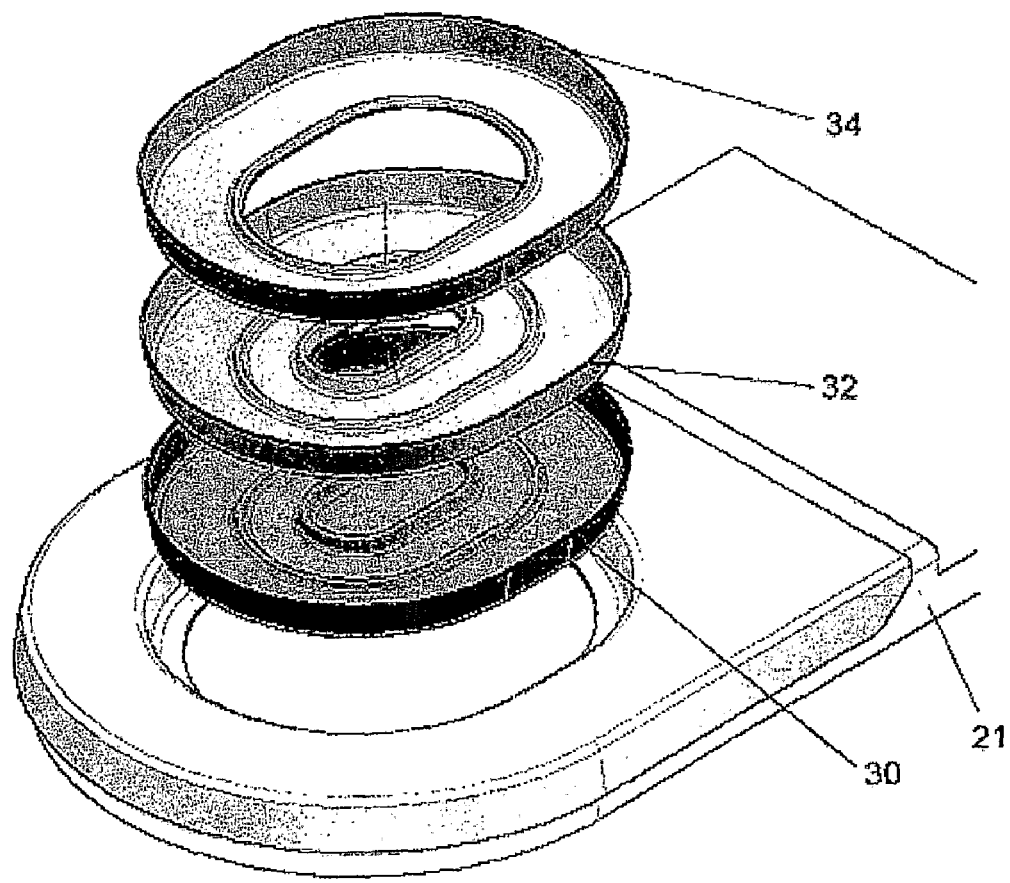
FIG. 4 shows a perspective view of a base unit of FIG. 1 together with three inserts for use with the base unit.

The base unit 10 is designed to fit over most conventional toilet pans, as seen in FIGS. 4 to 7. For clarity, the drawings showing the toilet pan only show the rim and upper surface of the toilet. The bowl itself is not shown. The aperture 18 is located within the opening 31 of a pan 21, with the perimeter wall 16 outside of the pan 21 and with a rim 28 of the bowl between the walls 16 and 20. The base unit is thus supported on the rim 28 by the upper wall 12. The unit 10 is supplied with a number of inserts that are designed to be placed into the well 19 and rest upon the horizontal wall 22. In the preferred embodiment there are three inserts, 30, 32 and 34, as shown in FIG. 4. These inserts reduce or totally block the aperture 18.

Figure 7:
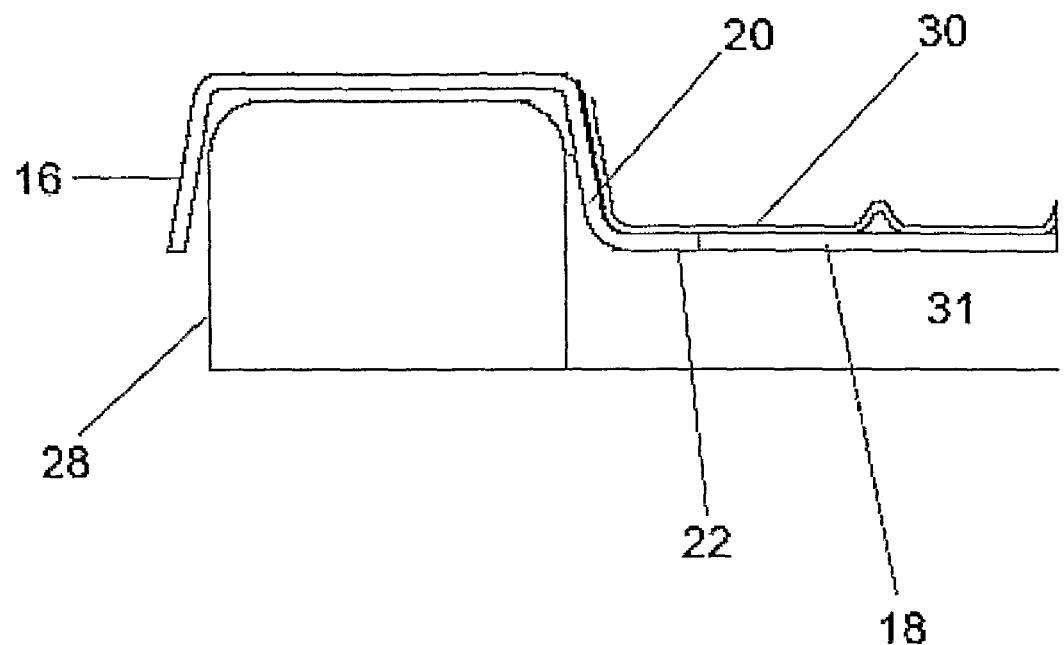
FIG. 7 shows a side cross sectional view taken along line A-A of FIG. 6.
Figure 14:
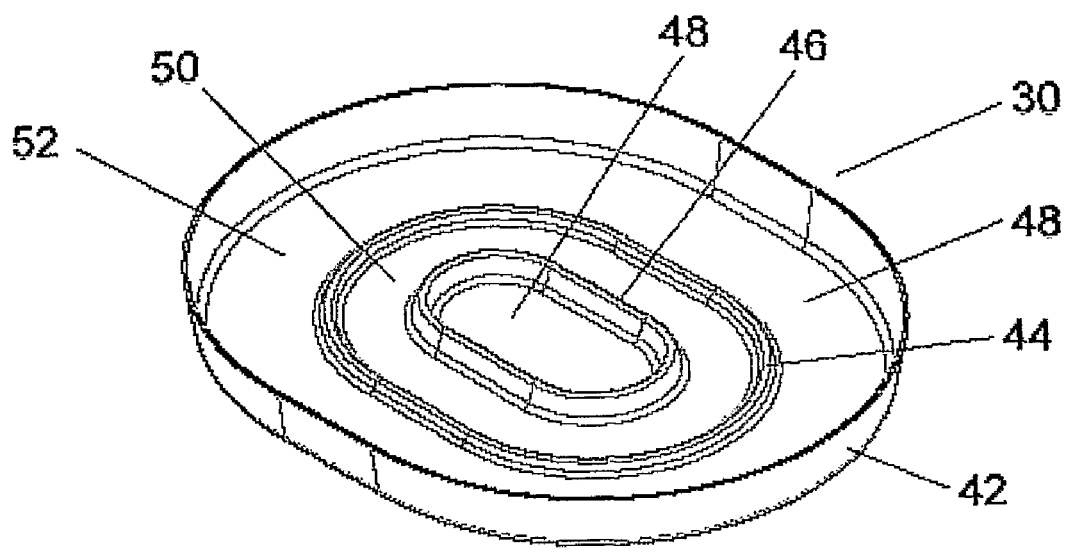
FIG. 14 shows a perspective view of the first insert.
Figure 15:
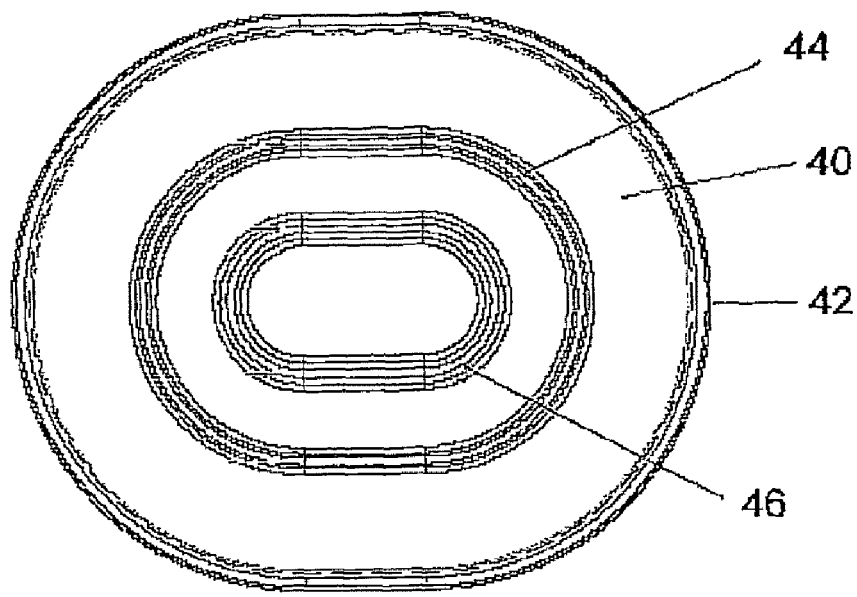
FIG. 15 shows a top plan view of the first insert of FIG. 14
Figure 16:
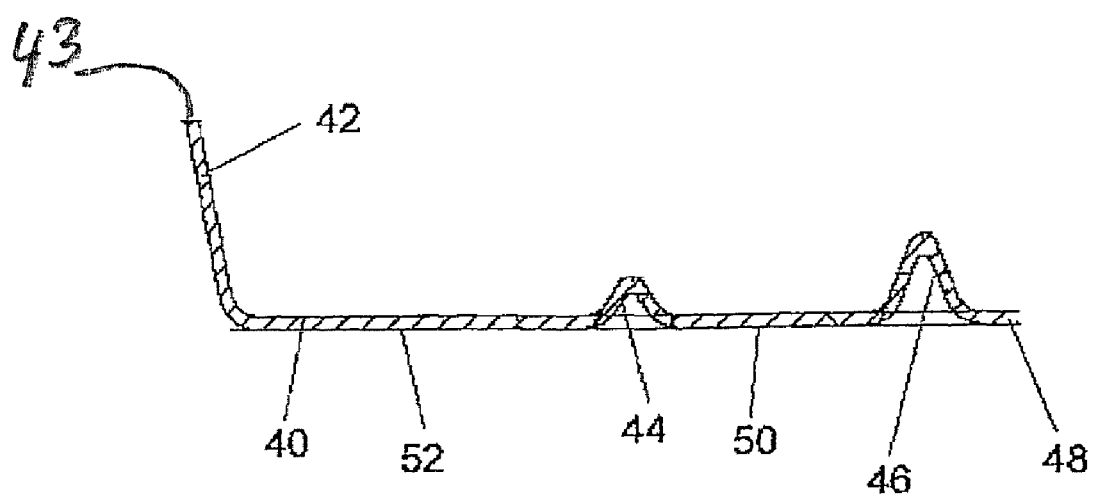
FIG. 16 shows a side cross sectional view taken along line G-G of FIG. 15.

Referring to FIGS. 14 to 16, the insert 30 has a base wall 40 and an upwardly extending perimeter wall 42. As seen in FIG. 7, the insert 30 is sized to fit snugly within the well 19, with the perimeter wall 42 adjacent the wall 20 and with the outer portion of the base wall 40 resting upon the annular wall 22. It follows that the shape of the peripheral wall will correspond to the shape of the well 19. The height of the perimeter wall 42 is such that its upper edge 43 remains within the well 19 below the plane of the wall 12.

The insert 30 includes two concentric ridges 44 and 46. In the preferred embodiment the insert 30 is formed by a vacuum moulding process and the ridges 44 and 46 are defined by deforming the base of the insert against a V-shaped groove or projection in the mould. Whilst the two ridges 44 and 46 provide some rigidity to the base wall 40, they are not critical to the invention.

The inserts 32 and 34 are created by first vacuum forming an insert with a solid base as per insert 30 and then cutting an aperture in the base wall 40. The ridges 44 and 46 are desired for the inserts 32 and 34 and, accordingly, the ridges 44 and 46 are present in insert 30. The inner ridge 46 extends about 10 mm above the base wall 40 whilst the outer ridge extends about 5 mm above the base wall 40. If desired, the two ridges, 44 and 46 may be the same height.

It will be appreciated that the base unit 10 and the three inserts may be formed by many other methods, such as a plastics injection moulding process. Further, separate moulds may be provided for manufacture of the different inserts. It will be appreciated that rigidity may be provided by forming the inserts with ridges or groove as appropriate and that any such ridges or grooves need not be circular, oval or concentric and may extend radially or in a simple grid. If desired any strengthening structures may be on either or both of the upper and lower surfaces of the base wall 40.

Figure 8:
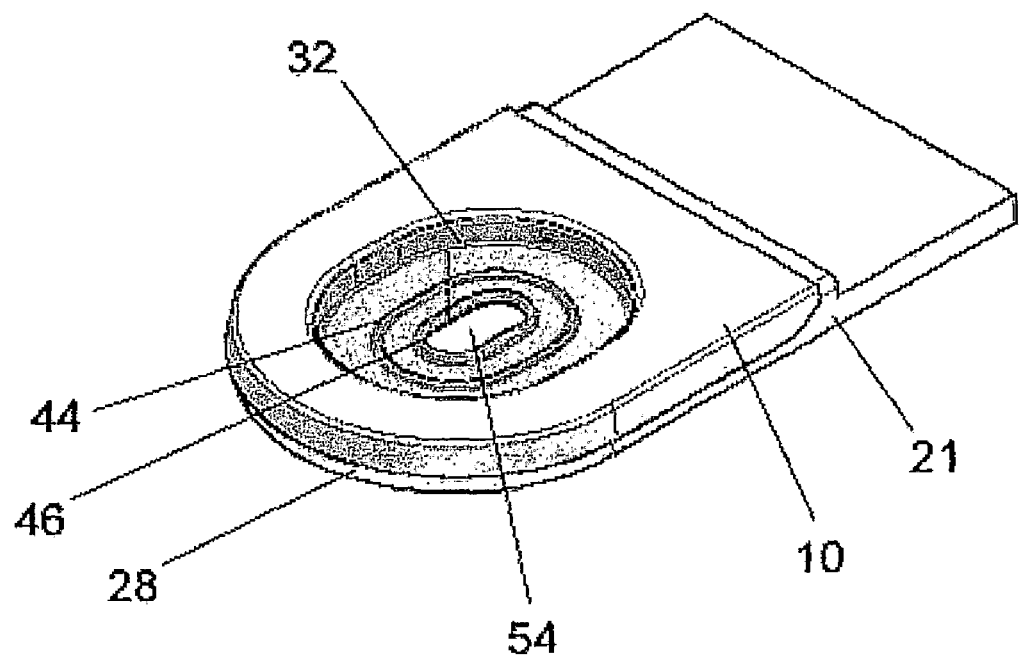
FIG. 8 shows a perspective view of the base unit located on a toilet bowl with a second insert mounted on the base unit.
Figure 9:
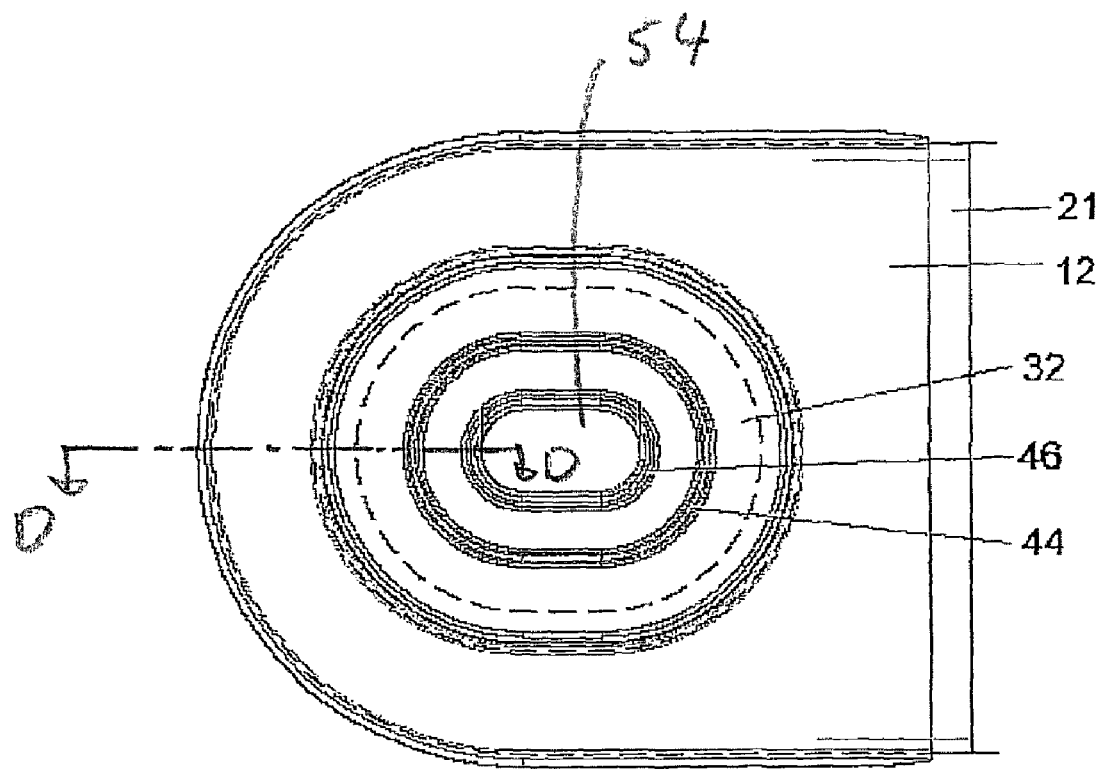
FIG. 9 shows a top plan view of the arrangement of FIG. 8
Figure 10:
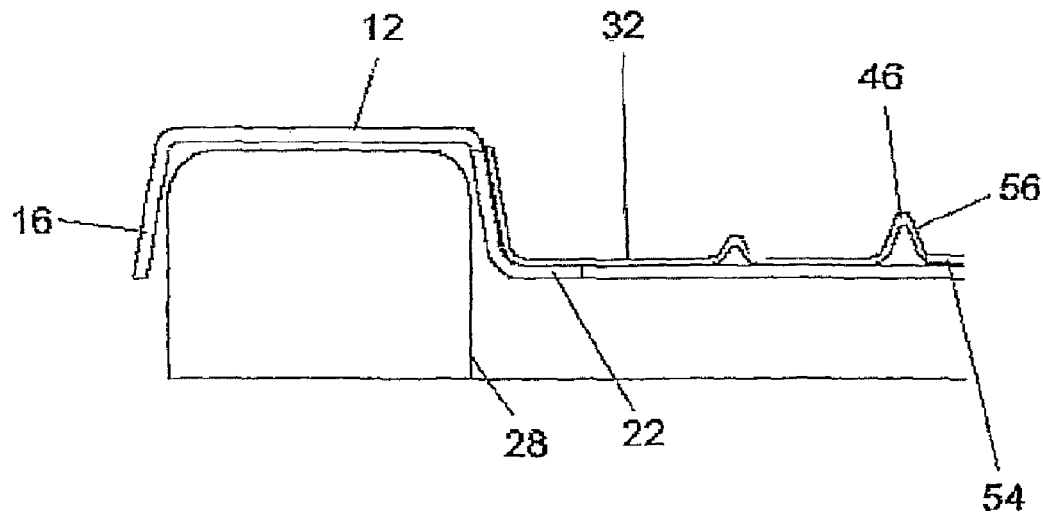
FIG. 10 shows a side cross sectional view taken along line D-D of FIG. 9.

The second insert 32, shown in FIGS. 8 to 10, is substantially the same as the first insert 30. However, the central portion 48 of the base wall 40 shown in FIG. 16, delineated by the inner ridge 46, has been removed, so as to define a relatively small aperture 54. As seen as FIGS. 9 and 10, the aperture 54 extends from the base of the inner wall 56 of the ridge 46 and in the preferred embodiment there is no horizontal annular wall inside of the ridge 46. This is preferred and is not critical. In the preferred embodiment this opening 54 has a width of about 50 mm and a length of about 100 mm.

Figure 11:
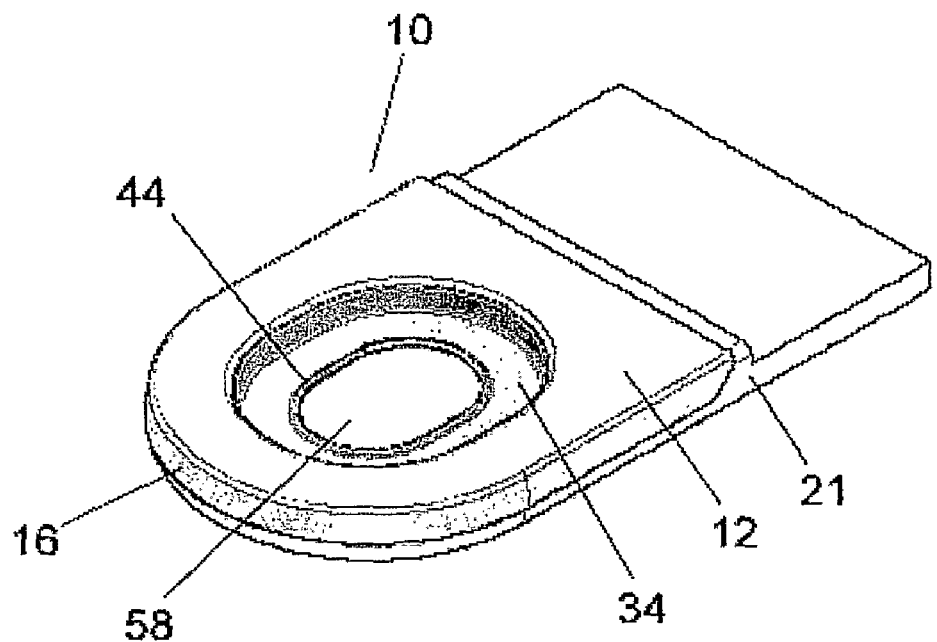
FIG. 11 shows a perspective view of the base unit located on a toilet bowl, with a third insert mounted on the base unit.
Figure 12:
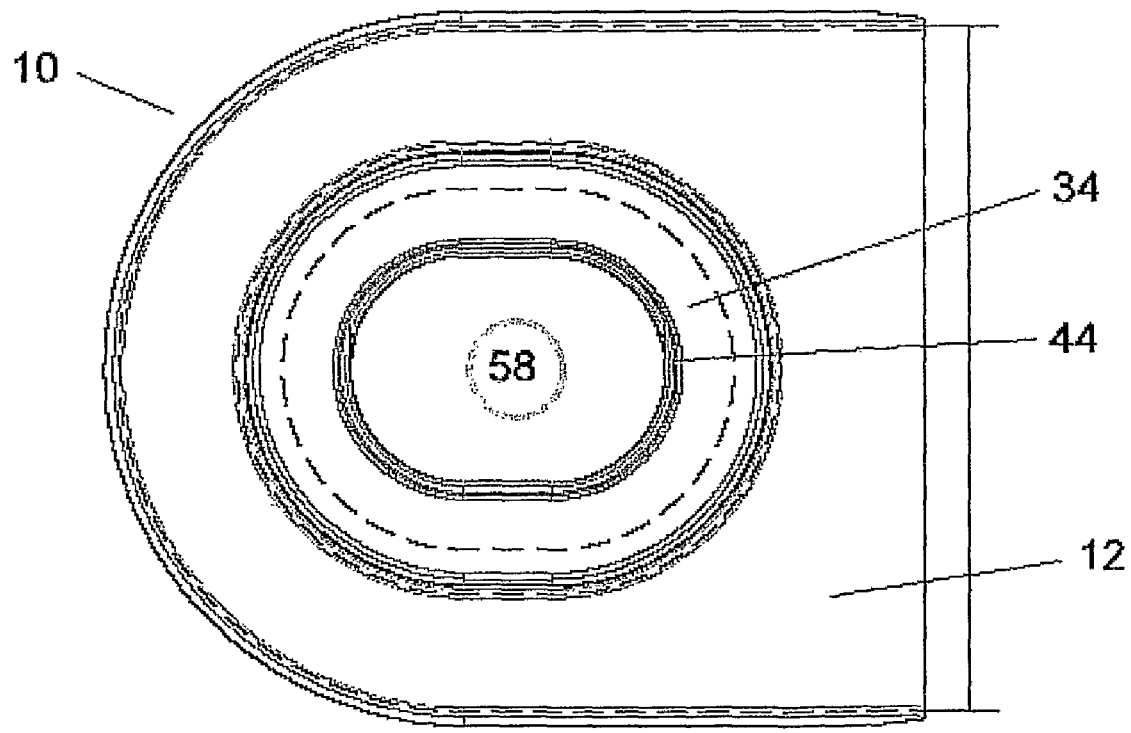
FIG. 12 shows a top plan view of the arrangement of FIG. 11
Figure 13:
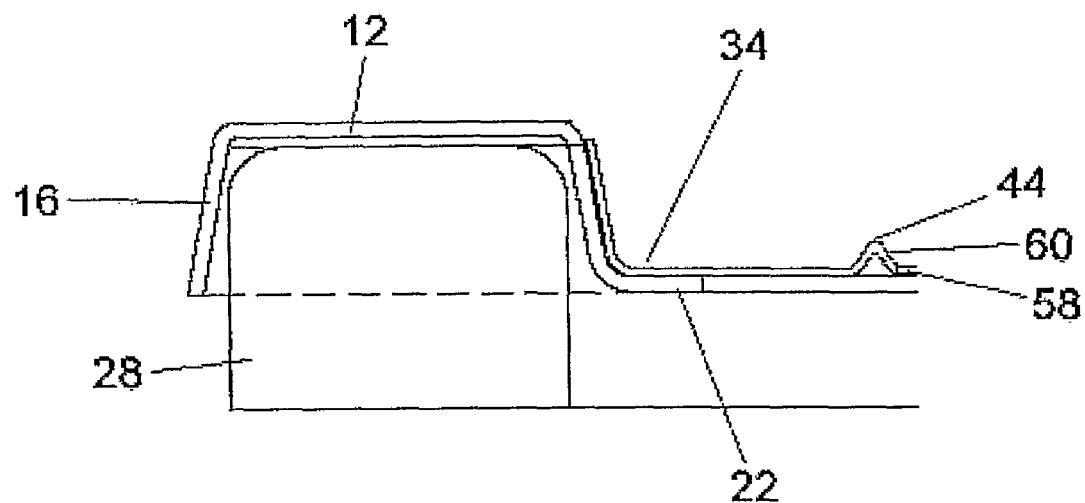
FIG. 13 shows a side cross sectional view taken along line F-F of FIG. 12.

The third insert 34, shown in FIGS. 11 to 13, is effectively the first insert 30 with the base wall 40 within the outer ridge 44 removed, so as to form an aperture 58. Thus the annular portion 50, the inner ridge 46 and the central portion 48 have been removed. As with the second insert 32, the aperture 58 extends from the base of the inner wall 60 of the ridge 44 and there is no horizontal wall inside of the ridge 44. Again, this is preferred and is not critical. In the preferred embodiment this opening 58 has a width of about 125 mm and a length of about 175 mm.

Figure 5:
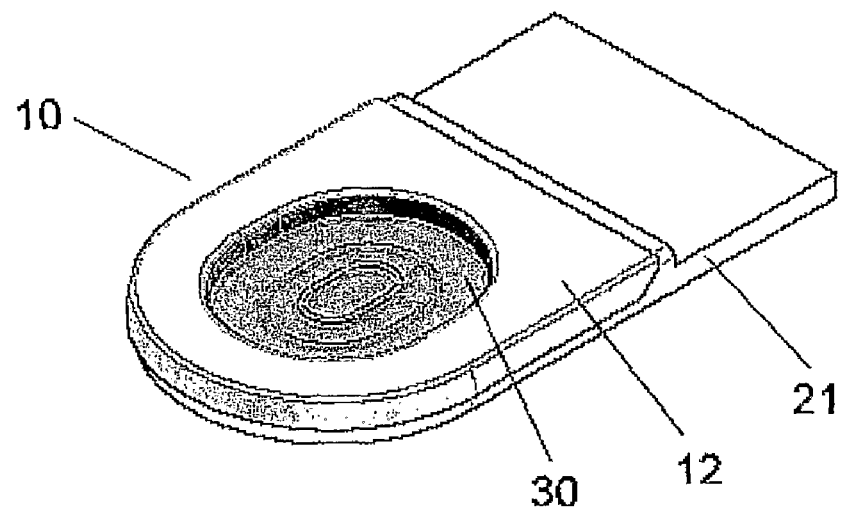
FIG. 5 shows a perspective view of the base unit located on a toilet bowl with a first insert mounted on the base unit.
Figure 6:
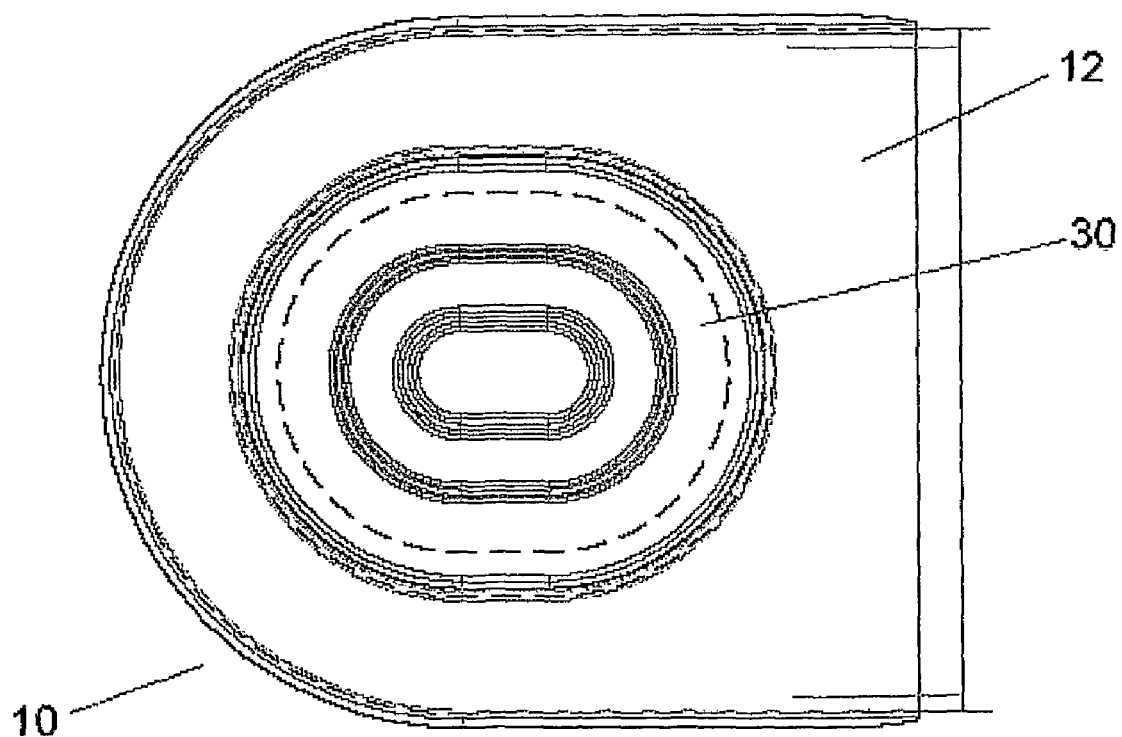
FIG. 6 shows a top plan view of the arrangement of FIG. 5.

It is relatively easy to train an animal to urinate or defecate into a tray placed on the ground that contains suitable absorbent material. The animal will urinate or defecate and, with cats, cover its waste with the absorbent material. For cats this is a semi-instinctive action to prevent the animal's waste being smelt by other animals. Accordingly, the initial step is to place the first insert 30 into the well 19 of base unit 10, as seen in FIG. 5. This closes off the aperture 18 and presents a well having a solid base. Suitable absorbent material is placed in the well to a suitable depth, usually about one to two centimeters. The depth of the absorbent material is sufficient to cover then two ridges 44 and 46. The well is approximately 26 mm deep and so the side walls extend above the level of the absorbent material. This aids in retaining the material within the tray and preventing its escape.

The well is preferably not too deep to discourage the animal from supporting itself on the upper surface 12 rather than the absorbent material since at the end of the training process there is usually no insert and only the aperture 18. As such, the animal must support itself on the upper surface 12. The insert 30 fully closes the aperture 18 in the base unit 10 and so no absorbent material, urine or faeces can easily escape through the aperture 18. It will be appreciated that if the animal urinates on the side wall 22 then some urine may escape through the gap between the sidewall 22 of the base unit and the side wall 42 of the insert. However, this is only likely to occur infrequently. If this is of concern to the owner the unit 10 may be placed on some newspaper or the other disposable material.

The base unit 10 and its insert 30 are then placed on the floor, preferably next to the toilet that one wishes the animal to eventually use. The animal is introduced to the unit and trained to use the unit, urinating and defecating onto the absorbent material as with a conventional tray having a solid base. Once the animal is comfortable using the unit, the next step is to train the animal to use unit whilst the unit is located on top of a toilet pan, as seen in FIG. 5. The toilet seat and lid (not shown) are raised and the base unit 10 is placed directly on the rim 28 of the toilet pan 21, with the rim 28 between the walls 16 and 20. The insert 30 remains within the well 19, fully closing the aperture 18, and the unit is used as before with absorbent material overlaying the base of the insert. Because the animal is already relatively comfortable with the unit and the unit has a solid base it is relatively easy to train the animal to use the unit whilst the unit is on the toilet as opposed to on the floor.

The next step is to replace the first insert with the second insert 32, which has the small aperture 54. As previously explained, this insert is substantially the same as the first insert 30 but with the aperture 54 in its centre.

Absorbent material is preferably placed in the insert between the outer peripheral wall 60 and the inner ridge 46. The ridge is about 10 mm high and so allows a reasonable dept of absorbent material to be put in the insert. This also covers the outer ridge 44, but this is not critical. The ridge 46 that surrounds the aperture 54 serves to limit the amount of absorbent material falling through the aperture but is not critical to the working of the invention. The base wall of the insert may be flat with no ridge or ridges and with an aperture simply formed in the base wall. However this would make it relatively easy for the absorbent material to be knocked through the aperture.

Because the animal is still using the absorbent material, initially some waste may be deposited on the absorbent material rather than through the aperture 54. When waste is deposited on the absorbent material the animal may attempt to cover it, with other absorbent material. The ridge 46 reduces the amount of absorbent material falling into the toilet bowl due to the animal moving the absorbent material. In addition, the absorbent material will need to be replaced and the inner ridge prevents spillage when doing so.

Because the animal is comfortable using the device on the toilet it is now relatively easy to train it to use the device with the insert 32 rather than insert 30. The animal will tend to sit on the outer portions 50, 52 of the insert or on the annular horizontal wall 12 of the base unit 10. The surface of the absorbent material is lower than the upper surface 12 and this also encourages the animal to support itself on the surface 12.

Because the aperture 54 is in the centre of the insert, it is relatively easy for the animal to urinate or defecate through the aperture with its waste of falling into the water in the toilet pan rather than onto the absorbent material. As mentioned, above one of the reasons that animals cover their wastes is to prevent other animals smelling the smell of the waste and becoming aware of the first animal's existence. Since the animal's urine and faeces fall into the water of the toilet pan the smell from these wastes is eliminated or substantially reduced. Further, the waste is not present on the absorbent material of the tray for the animal to attempt to cover. Initially the animal may attempt to cover its waste by scraping at the absorbent material and some absorbent material will fall into the toilet pan. However, as the animal becomes used to using the aperture 54, this will be reduced.

Once the animal is comfortable using the unit with the second insert 32 the next step is to replace the second insert 32 with the third insert 34. The insert 34 has a larger aperture 58, again with a ridge 46 around its edge to prevent and/or limit absorbent material falling through the aperture 58 into the toilet pan. Because the aperture 58 in the third insert 34 is an incremental increase in size compared to the aperture 54 in the second insert 32, the size of the aperture should not discourage the animal from using the device. Accordingly the animal will adapt relatively rapidly to using the device with the larger aperture. Because the aperture is larger the proportion of waste falling into the toilet bowl will be higher and the animal's need to cover its waste will be further reduced.

Finally, once the animal is comfortable with the larger aperture 58, the third insert 34 may be removed totally and the animal will then use the device with just the bare base unit 10, without any absorbent material or other insert.

It will be appreciated that other ways of varying the size of the aperture during the training process exist and may be used. The device may be provided with an iris arrangement, similar to that found in the lenses of cameras, by means of which the size of the aperture may be adjusted. Alternatively one or more horizontal trays or walls may be supported by slots in the base unit that partially or fully close the aperture. Initially the tray may be fully inserted to close the aperture in the base unit. By progressively withdrawing the horizontal tray through the slot to one side, the size of the aperture it is increased until, eventually, the tray may be removed totally. It will be appreciated that such an embodiment would require the mounting for the adjustable tray to be located above the toilet pan.

Whilst the preferred embodiment provides a base unit into which inserts are placed with differing size apertures, a single insert may be provided that allows for different sized apertures.

Figure 17:
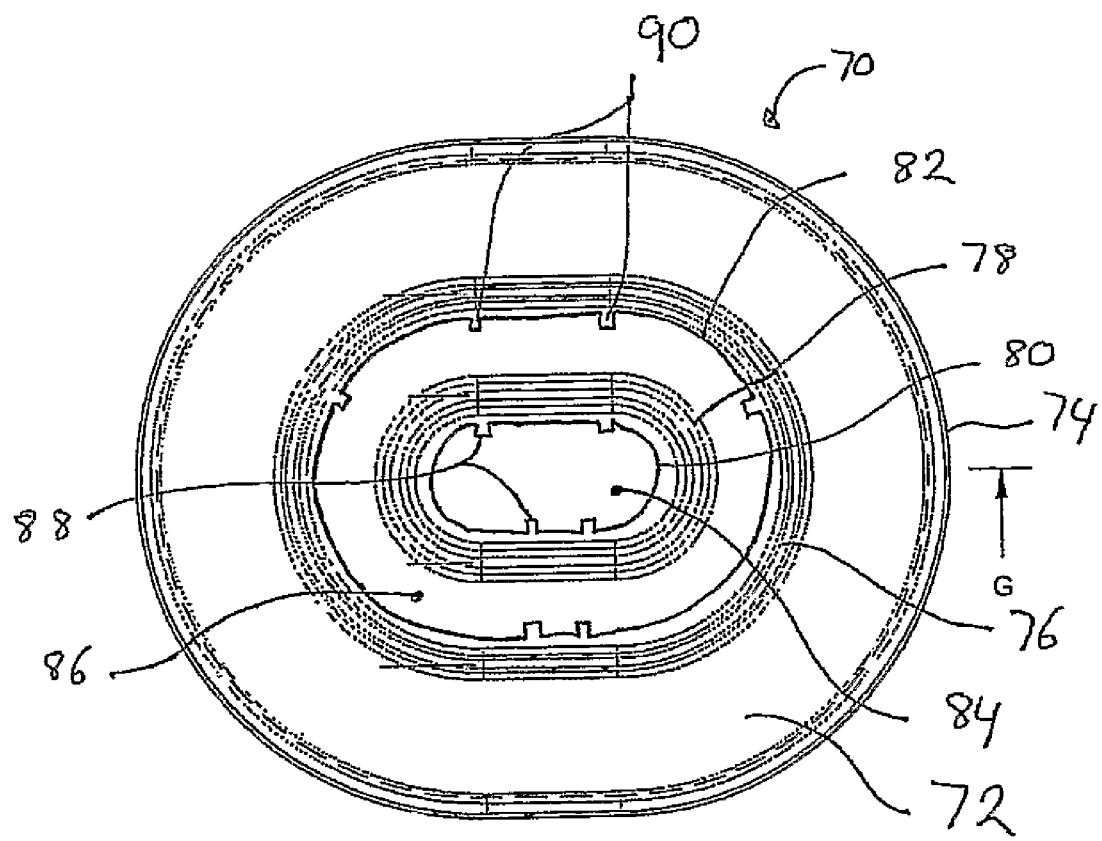
FIG. 17 shows a top plan view of an alternate insert for use with the base unit of FIG. 1.

FIG. 17 shows an insert 70 for use with the base unit 10 of FIG. 1. The insert 70 is similar to the insert 30 and is provided with a solid base wall 72, side wall 74 and ridges 76 and 78. Located inwards of the two ridges are two concentric lines of weakness 80 and 82.

Initially the insert is used as shown in FIG. 13, with the solid base wall, until an aperture is needed. At this point the inner portion 84 of the base wall 72 defined by the inner line of weakness 80 is removed. The line of weakness 80 may be configured that the user may merely press out the inner portion 84. Alternatively it may be necessary to cut along the line of weakness 80 to remove the inner portion 84. This transforms the insert into the functionally equivalent of the second insert 32, with an aperture through which waste may pass.

The insert 70 is used as described with the smaller aperture until it is time to increase the aperture size. The annular ring 86 that is defined between the two lines of weakness 80, 82 is now removed and the insert is now functionally equivalent to the third insert 34. Finally, once the animal is comfortable using the device with the larger aperture, the inset may be removed totally.

The two lines of weakness 80, 82 are preferably provided with a plurality of "tabs" 88 and 90 respectively. These tabs are not essential but enable reuse of the inner portion 84 and the annular ring 86. When the inner portion 84 and annular ring 86 are removed corresponding cut-outs are formed in the outer edge of the pieces removed.

The inner line of weakness 80 has tabs 88. These tabs are spaced along the line of weakness so as not to be diametrically opposite another tab. Once the inner portion has been removed, if it is rotated 180° from its original position and placed into the remainder of the insert, the tabs remaining on the insert will not align with the cut-outs in the inner portion 84. Instead the tabs will lie under part of the inner portion 84 and support it. Whilst the cut-outs will each provide a very small aperture through which absorbent material may fall, effectively the opening is closed.

The tabs 90 are similarly arranged on the outer line of weakness 82 so that rotating the annular ring 86 enable it to be supported by the tabs 90.

By enabling the removed pieces to be supported, the insert may be used to train another animal or to regress to a smaller aperture if the animal is not ready for the larger aperture.

It will be appreciated that the lines of weakness need not be continuous but may be discontinuous, with sections of full strength between the ends of adjacent sections of a line of weakness.

As mentioned previously, the concept behind the invention is to provide a tray for the animal that initially has no aperture and to progressively increase the size of the aperture until there is merely a support upon which the animal may support itself whilst it defecates or urinates into the toilet. Whilst the invention utilises three replaceable inserts it will be appreciated that the number of inserts used may be varied. Further, for a small animal, it may not be practicable to utilise the base unit by itself. The third insert 34 may be used or an insert may be used that provides a substantially continuous horizontal surface to the animal with a smaller aperture.

Figure 18:
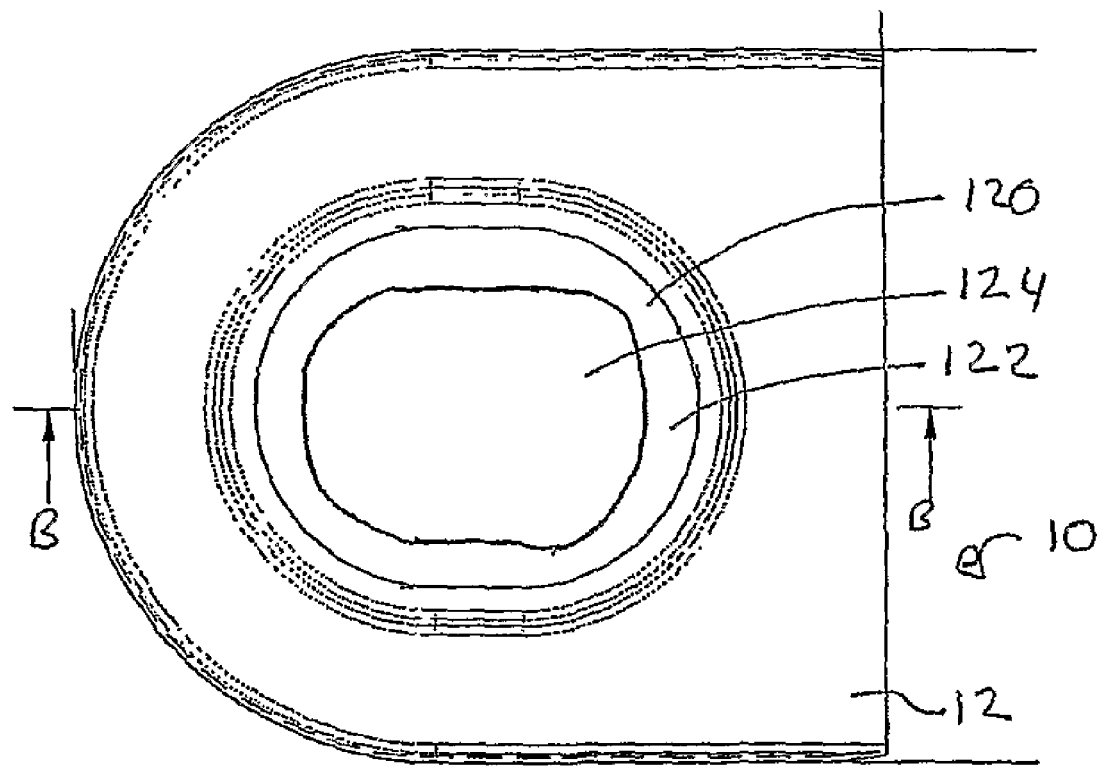
FIG. 18 shows a top plan view of an alternate insert for use with the base unit of FIG. 1.
Figure 19:
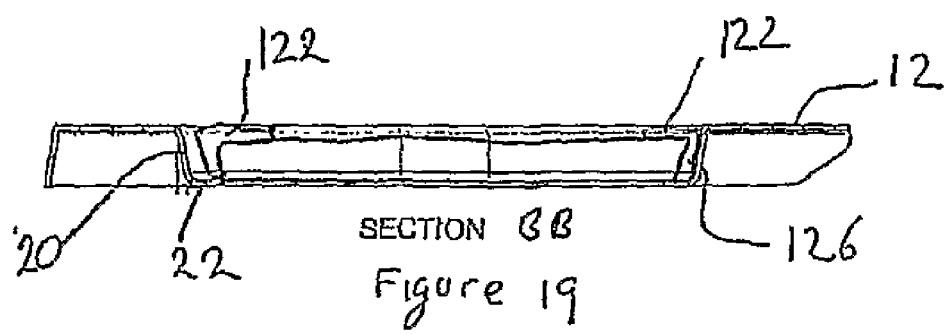
FIG. 19 shows a side cross sectional view taken along line B-B of FIG. 18.

FIGS. 18 and 19 show an insert 120 located in the well 19 of base unit 10. The insert has an annular wall that defines an aperture 124. Extending downwards and inwards at about 80° to the horizontal is a peripheral wall 126. This wall 126 fits snugly against the wall 20 of the base unit and rests on the annular wall 22. The height of the peripheral wall 126 is such that the upper surface of the walls 12 and 122 are substantially coplanar.

It will be appreciated that rather than using a separate insert with removable portions, the base unit 10 may be manufactured with a solid base wall 22 that extends across all of the "aperture" 18 and lines of weakness may be provided in the base wall 22 to allow removal of portions of the wall 22 to provide a series of progressively larger apertures.

It will be apparent to those skilled in the art that many obvious modifications and variations may be made to the embodiments described herein without departing from the spirit or scope of the invention.

The claims defining the invention are as follows:

1. A companion animal toileting system including:
   a base unit adapted to be temporarily supported on the rim of a toilet bowl, the base unit having:
   a generally horizontal upper wall portion having a lower surface adapted to be placed on the top of the rim of the toilet;
   a recess in the upper wall that extends below the lower surface and in use into the bowl and into which companion animal may urinate, defecate or both, the recess defined by:
   a closed curve opening in the upper wall portion;
   a side wall portion that extends downwards from the upper wall portion, and
   a horizontal annular first base wall portion extending inwards from the side wall portion and spaced vertically below the lower surface, the annular first base wall defining a first aperture, through which animal waste may pass into the bowl of the toilet;
   a plurality of substitutable apertured blocking members, each having a second base wall portion with a second aperture therein defined by a closed curve, the second apertures in the aperture blocking members being of different sizes and being smaller than the first aperture;
   each blocking member having a retaining wall adjacent to and surrounding the second aperture extending upwards from an upper surface of the second base wall portion adjacent the retaining wall,
   the second base wall portions of each of the plurality of blocking members sized to be received in the recess and supported in the recess by the first base wall portion;
   said base unit configured to support a single one of the apertured blocking members at a time to reduce the effective size of first aperture,
   the effective size of the first aperture being adjustable to one of a plurality of different sizes by supporting a single one of the blocking members on the base unit in the recess or substituting the single blocking member supported on the base unit in the recess with a different one of the blocking members.

2. The animal toileting system of claim 1 including a substitutable non-apertured blocking member that totally or substantially totally blocks the first aperture.

3. The animal toileting system of claim 1 wherein at least one blocking member includes a peripheral wall extending upwards from the upper surface of the second base wall portion adjacent an outer periphery of the blocking member.

4. The animal toileting system of claim 3 wherein a height of the peripheral wall is substantially the same as a height of the side wall portion.

5. The animal toileting system of claim 1 wherein the second base wall portion includes at least one stiffening structure for stiffening the second base wall portion.

6. The animal toileting system of claim 5 wherein the second base wall portion is generally planar and wherein the at least one stiffening structure extends upwardly from the plane of the second wall portion.

7. The animal toileting system of claim 5 wherein the at least one stiffening structure includes at least one ridge or discontinuity in the second base wall portion.

8. The animal toileting system of claim 1 wherein the base unit includes an outer retaining wall portion that extends downwards from an outer periphery of the upper wall portion below the lower surface of the upper wall portion and with the side wall portion defines a recess to receive at least part of the rim of a toilet.

9. The animal toileting system of claim 8 wherein the outer retaining wall portion has a lower edge substantially coplanar with a lower surface of the first base wall portion.

10. The animal toileting system of claim 1 wherein the base unit includes an outer retaining wall portion that extends downwards from an outer periphery of the upper wall portion below the lower surface of the upper wall portion and with the side wall portion defines a recess to receive at least part of the rim of a toilet and wherein the outer retaining wall portion has a lower edge substantially coplanar with a lower surface of the first base wall portion and wherein lower edge and lower surface are the lowest parts of the base unit.

11. The animal toileting system of claim 1 wherein at least one blocking member is sized to fit within another blocking member.

12. The animal toileting system of claim 1 wherein the first base wall portion includes at least one detachable first portion defined in part by a line or weakness or perforations, whereby the first aperture may be created or the size of the first aperture may be modified by detaching the first detachable portion from the remainder of said first base wall portion.

13. The animal toileting system of claim 1 wherein said second base wall portion of at least one blocking member includes at least one detachable portion defined in part by a line or weakness or perforations, whereby an aperture in the blocking member may be created or the size of an aperture in the blocking member may be modified by detaching the detachable portion from the remainder of said second base wall portion.

14. A method of training an animal to use a human toilet bowl, the method including the steps of:
  a. providing a base unit,
    the base unit having
      a generally horizontal upper wall portion having a lower surface adapted to be placed on the top of the rim of the toilet;
      a recess in the upper wall that extends below the lower surface and in use into the bowl and into which a companion animal may urinate, defecate or both, the recess defined by:
        a closed curve opening in the upper wall portion;
        a side wall portion that extends downwards from the upper wall portion, and
        a horizontal annular first base wall portion extending inwards from the side wall portion and spaced vertically below the lower surface, the annular first base wall defining a first aperture, through which animal waste may pass into the bowl of the toilet;
      a plurality of substitutable apertured blocking members, each having second base wall portion with a second aperture therein defined by a closed curve, the second apertures in the aperture blocking members being of different sizes and being smaller than the first aperture;
      each blocking member having a retaining wall adjacent to and surrounding the second aperture extending upwards from an upper surface of the second base wall portion,
      the second base wall portions of each of the plurality of blocking members sized to be received in the recess and supported in the recess by the first base wall portion;
    said base unit configured to support a single one of the apertured blocking members at a time to reduce the effective size of first aperture,
    the effective size of the first aperture being adjustable to one of a plurality of different sizes by supporting a single one of the blocking members on the base unit in the recess or substituting the single blocking member supported on the base unit in the recess with a different one of the blocking members,
  b. positioning the base unit on a toilet bowl; and,
  c. training the animal to urinate, defecate or both into the recess whilst the base unit is on the toilet bowl, and
  d. changing the effective size of the first aperture by placing one of said substitutable apertured blocking members in the recess of the base unit or by substituting a substitutable apertured blocking member supported in the recess of the base unit with a different one of the substitutable apertured blocking members.

15. The method of claim 14 wherein initially the recess is accessible to the companion animal but the first aperture is fully or substantially fully closed.

16. The method of claim 14 including providing a substitutable non-apertured blocking member and wherein initially said substitutable non-apertured blocking member is located in the recess of the base unit to substantially or fully close the first aperture.

17. The method of claim 14 wherein the effective size of the first aperture is progressively increased by substituting a substitutable apertured blocking member supported in the recess of the base unit with a substitutable apertured blocking members having a larger aperture therein.

18. The method of claim 17 wherein said second base wall portion of at least one blocking member includes at least one first detachable portion defined in part by a second line or weakness or perforations, whereby an aperture in the blocking member may be created or the size of an aperture in the blocking member may be modified by detaching at least one first detachable portion from the remainder of said second base wall portion and wherein the method includes removing at least one detachable portion.

19. The method of claim 17 wherein the first base wall portion includes at least one detachable second portion defined in part by a first line or weakness or perforations, whereby the first aperture may be created or size of the first aperture may be modified by detaching at least one first detachable portion from the remainder of said first base wall portion and wherein the method includes removing at least one detachable second portion.

20. The method of claim 14 also including, before step b., first positioning the base unit on the floor with no aperture in the first base wall or with the aperture in the first base wall fully blocked by a non apertured blocking member, and training the animal to urinate, defecate or both into the recess whilst the base unit is located on the floor and then placing the base unit on the toilet.

21. The method of claim 14 including placing absorbent material in at least part of the recess.

* * * * *